(12) United States Patent
Cordelle et al.

(10) Patent No.: US 8,808,940 B2
(45) Date of Patent: Aug. 19, 2014

(54) SOLID OXIDE FUEL CELL WITH SEALED STRUCTURE

(75) Inventors: Frédérique Cordelle, Azay le Rideau (FR); Laure Desmazes, Joue-les-Tours (FR)

(73) Assignee: Commissariat a l'Energy Atomique, Paris (FR)

( * ) Notice: Subject to any disclaimer, the term of this patent is extended or adjusted under 35 U.S.C. 154(b) by 571 days.

(21) Appl. No.: 10/593,187

(22) PCT Filed: Mar. 18, 2005

(86) PCT No.: PCT/JP2005/050172
§ 371 (c)(1),
(2), (4) Date: Sep. 18, 2006

(87) PCT Pub. No.: WO2005/093887
PCT Pub. Date: Oct. 6, 2005

(65) Prior Publication Data
US 2007/0148522 A1    Jun. 28, 2007

(30) Foreign Application Priority Data
Mar. 22, 2004  (FR) ..................... 04 50568

(51) Int. Cl.
*H01M 8/02*    (2006.01)
*H01M 8/12*    (2006.01)
*H01M 8/24*    (2006.01)

(52) U.S. Cl.
USPC ........... 429/460; 429/458; 429/465; 429/469; 429/482; 429/508; 429/518; 429/535

(58) Field of Classification Search
USPC ........ 29/34; 429/34, 458, 460, 465, 469, 482, 429/508, 518, 535
See application file for complete search history.

(56) References Cited

U.S. PATENT DOCUMENTS 3,554,808 A * 1/1971 Fischer et al. .................. 429/32
4,770,955 A * 9/1988 Ruhl ............................... 429/33
(Continued)

FOREIGN PATENT DOCUMENTS

EP    1 261 059 A2    11/2002
EP    1403947         3/2004
(Continued)

OTHER PUBLICATIONS

Machine translation of KR 1020040014273, Hado et al., Feb. 2004.*
(Continued)

*Primary Examiner* — Sean P Cullen
(74) *Attorney, Agent, or Firm* — Baker Hostetler LLP

(57) ABSTRACT

This invention relates to the presence of slightly or non-porous zones in the electrode layer around gas inlets, in order to improve the leak tightness between the different individual cells making up a fuel cell with a plane geometry. The fuel cell comprises a first electrode layer having a non-porous zone forming a passage therethrough for gas flow and an electrolyte layer having a protuberance which extends into the first electrode layer for forming the non-porous zone with the non-porous zone representing a gas tight passage. Nested contact between the bipolar plate and the ceramic triple layer making up the basic cell is also described and is another possible means of avoiding mixes of gasses.

11 Claims, 6 Drawing Sheets

(56) References Cited

U.S. PATENT DOCUMENTS

| | | | |
|---|---|---|---|
| 5,445,903 A * | 8/1995 | Cable et al. ................ | 429/33 |
| 5,527,634 A * | 6/1996 | Meacham ................... | 429/35 |
| 5,589,285 A | 12/1996 | Cable et al. | |
| 2004/0058223 A1* | 3/2004 | Shibata et al. ............. | 429/38 |
| 2004/0137301 A1* | 7/2004 | Omersa ...................... | 429/34 |
| 2004/0175607 A1* | 9/2004 | Itoh ............................ | 429/35 |

FOREIGN PATENT DOCUMENTS

| | | |
|---|---|---|
| EP | 1 469 540 | 10/2004 |
| JP | 2004087491 | 3/2004 |
| KR | 2004014273 A * | 2/2004 |
| WO | WO 03032420 A2 * | 4/2003 |
| WO | WO 2004/062018 A1 | 7/2004 |

OTHER PUBLICATIONS

Machine translation of WO 03032420 A2, Bram et al., Apr. 2003.*
International Search Report (PCT/ISA/220).

* cited by examiner

SOLID OXIDE FUEL CELL WITH SEALED STRUCTURE

TECHNICAL FIELD AND BACKGROUND ART

This invention relates to SOFC type fuel cells, in other words solid oxide fuel cells.

A fuel cell is a system that produces electricity from hydrogen, oxygen and an electrolyte by a catalyst reaction; the electrolyte separates the anode and the cathode while allowing transfer of the ionised species.

There are several types of fuel cell, the main difference being the nature of their electrolyte (liquid, polymer among others). Among these, the solid oxide fuel cell or SOFC has many advantages, including the fact that only two phases are present, namely solid and gas. Its operating temperature (of the order of 900° C.) and the heating time are such that this cell is suitable mainly for stationary applications.

As illustrated in FIG. 1, an anode (12) and a cathode (14) are separated in SOFCs by a solid electrolyte (16) through which $O^{2-}$ ions produced by the cathode and necessitated by the anode can circulate:

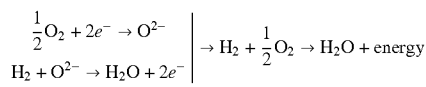

This assembly produces a voltage of the order of 1 volt with a high efficiency.

In order to obtain higher powers for commercial use, several "cells" can be associated in series or in parallel. This assembly requires that the geometry of each element and the overall architecture should be optimised, particularly for the distribution of gases, recuperation of electricity, etc.

One of the envisaged geometries is the tubular architecture: a tube is used as a support for the cathode (at the centre) surrounded by electrolyte plus an anode layer. However, the length of the current lines that it generates causes strong losses by the Joule effect and limits the power output.

One preferred embodiment is a plane architecture. Cells then have at least two gas inlets and are composed of a stack of plane cells consisting of the triple anode/electrolyte/cathode layer separated by a bipolar plate that collects current and distributes gases.

For a fuel cell, each anode must be supplied with hydrogen and each cathode must be supplied with oxygen, which particularly in the case of SOFCs, may be pure or mixed, for example in air or in an oxygen enriched air. On the other hand, contact between oxygen and hydrogen must be avoided: they burn, which reduces the performances of the cell, and particularly the mix can explode.

Although it may be easy to avoid mixing of the two gases for a single cell, for example by means of a sealed electrolyte that prevents gas transfers, in an assembly of SOFC cells in which individual cells are stacked, it is also important to assure leak tightness between the different cells, regardless of the temperature. Conventional seals no longer act at the high temperature developed by this type of cell; glass seals have been built specially for this purpose. However, the temperatures reached make the glass seals pasty: after cooling, they are no longer leak tight for a second temperature cycle (if any) in the cell.

Thus, it appears desirable to develop cell architectures that do not need seals, the properties of the new cell assemblies being optimum at the different temperatures that occur during operation of SOFC type fuel cells.

SUMMARY OF THE INVENTION

The invention provides the means of choosing physical characteristics of materials to overcome problems caused by the use of fuel cells.

The invention is also intended to solve leak tightness problems that arise between the different elements of cells used in SOFCs with a plane architecture.

According to one of its aspects, the invention relates to the presence of "compact" areas within a porous electrode layer: these "compact" areas are actually denser or less porous than the remainder of the electrode layer, or are even non-porous at all. In fact, in a fuel cell, the anode and the cathode must enable gas transfer to the electrolyte, and they are therefore porous; creation of zones that are not or only slightly porous then makes it possible to make a duct or a gas inlet, for example by drilling, that can be made leak tight.

Therefore the invention relates particularly to a three-layer structure comprising two porous electrode layers enabling gas transfer, these layers having a first porosity and a second porosity, and a solid electrolyte layer, one of the electrode layers comprising at least one area such that the third porosity is less than the first and the second porosity, referred to in this application as the <<compact zone>>. Advantageously the third porosity is such that the zone is very slightly porous, in other words the third porosity is very much lower than the first.

The compact zone, in other words that is only slightly or is less porous, in the electrode layer may be placed around the inlet of the first gas that is not intended for this electrode (for example around an oxygen inlet for the anode): this can prevent mixing at this electrode of the first gas with the second gas that circulates in the same electrode to trigger the catalyst reaction.

In particular, the non-porous or slightly porous zone can be created by densification of the porous material of the electrode, and/or by a protuberance of the electrolyte layer, which is dense and gastight, in the electrode layer.

The invention also relates to a fuel cell in which each electrode layer has at least one such area that is non-porous or is only slightly porous, for example for which the electrolyte is thickened and/or the material from which the electrode is made is densified.

These basic elements may be assembled in a cell with a plane architecture. In one of its preferred embodiments, the invention relates to a fuel cell composed of an assembly of cells for which the air or gas inlets are adjacent to areas that are slightly porous or are non-porous, of anodes and hydrogen or gas inlets being adjacent to cathodes in areas that are slightly porous or are non-porous.

According to another aspect, the invention relates to a specific binding between a bipolar plate and an electrode or electrolyte in order to overcome problems caused by gas infiltrations between the electrode and the bipolar plate, or between the electrolyte and the bipolar plate, and therefore to give a good seal. This type of assembly also provides a means of increasing the resistance to shear, particularly when the temperature increases.

Coefficients of thermal expansion of the different ion exchanger elements of the triple layer, usually made of ceramic, are lower than the coefficient of thermal expansion of the bipolar plate which is usually metallic. When the temperature rises due to operation of the cell, this difference may cause loss of mechanical bond between the plate and the cell.

Creation of binding between the ceramic and the metal provides a means of limiting creation of passages along which the gases could pass.

Binding is preferably done by nesting of a protuberance of the bipolar plate in a cavity created in the ceramic structure. By seizing the protuberance to correspond to the corresponding cavity, it is possible to achieve easy assembly at ambient temperature and binding at the cell operating temperature. Advantageously, to improve the mechanical strength, this cavity is located in an area that is non-porous or is slightly porous in the electrode layer as defined above, in other words for example in the extra-electrolyte thickness or in a densified zone of the electrode.

DETAILED DESCRIPTION OF PARTICULAR EMBODIMENTS

Figure 1:
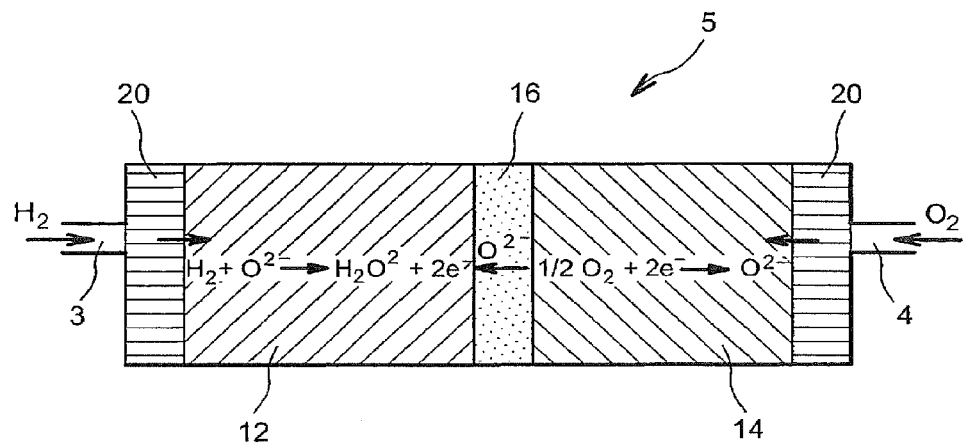
FIG. 1 diagrammatically shows the reactions that occur in a basic cell of a fuel cell.

FIG. 1 diagrammatically shows the operating principle of a fuel cell. As can be seen, oxygen is used by the cathode (14) to produce $O^{2-}$ ions that react with hydrogen at the anode (12). An oxygen inlet as a chemical element is shown: $O_2$ is used by the cathode, but the gas inlet (4) in the cell may for example be either an air inlet, or an oxygen enriched air inlet, or a pure oxygen inlet or an inlet of oxygen mixed with any other gas.

The electrodes (12, 14) are porous so that the gases can diffuse and react. On the other hand, the electrolyte (16) only enables $O^{2-}$ ions to diffuse and is dense and leak tight. The energy released is retrieved at the bipolar plates (20), which are usually made of metal. Furthermore, the bipolar plates (20) very often enable distribution of gas through channels created in their structure, and evacuation of water formed by the reactions.

The diagram in FIG. 1 also shows a basic cell (5) for the plane architecture of fuel cells (1): a conventional fuel cell consists of a stack of cells (5) according to FIG. 1, in parallel or in series, in order to increase the energy quantity produced.

Figure 2:
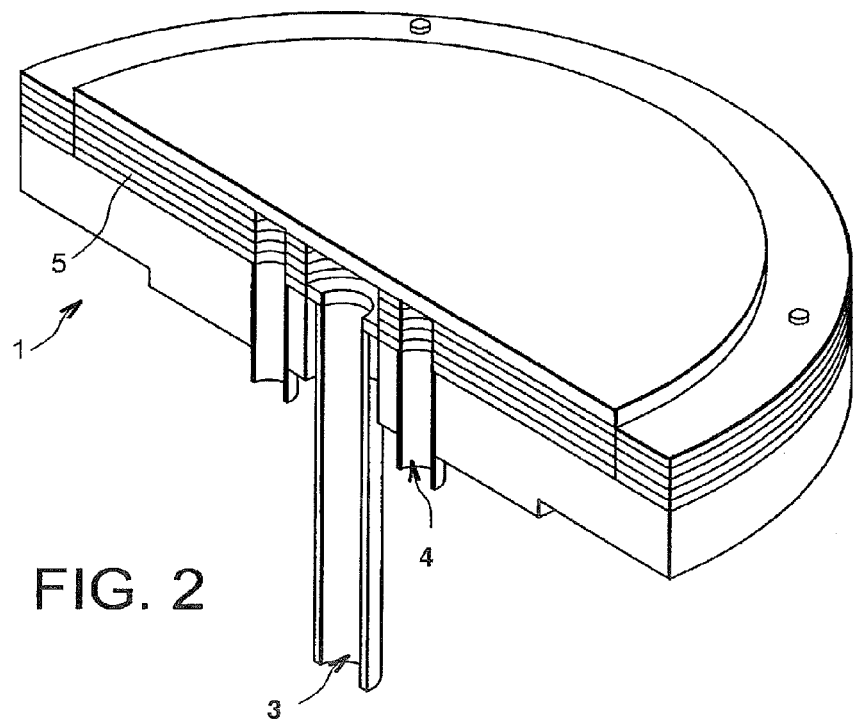
FIG. 2 shows an example of a circular plane geometry of a fuel cell made in accordance with the invention.

As can be seen in FIG. 2, one possibility is the circular plane geometry of the cell (1) with a stack of cells (5). Note that the gas inlets 3 and 4 of F*ig*. 1 define passages for air/enriched oxygen and hydrogen which pass through the cells (5) or are adjacent to them so as to reach different electrode layers (12, 14) to enable reactions. The gas inlets 3 and 4 are also shown in FIG. 2 corresponding to the air/enriched oxygen inlet 3 and to the hydrogen inlet 4 of FIG. 1. Consequently, it can be seen in FIGS. 1 and 2 that the air passage also passes, for example, through an area in which an anode layer is present, and in which hydrogen circulates. Therefore it is important to have leak tightness between the air inlet (4) and the anode (12), and similarly for the cathode (14) and the hydrogen inlet (3), in other words in the zone of the electrode adjacent to the gas inlet that is not dedicated to it.

To mitigate the risk of air (in other words oxygen) and hydrogen becoming mixed, the invention proposes to use an electrode layer for the anode and cathode in which zones that are slightly porous or are non-porous (11, 11') in other words less porous than the remainder of the electrode layer, are created. A porosity of the order of 30% may be suggested for the porous layer and a porosity of less than 6% for dense areas, with a density above 94% of the theoretical density.

Therefore, the invention also relates particularly to electrode/electrolyte dual layers in which the electrode layer was chosen locally or made less porous: see FIG. 3. Note that only one electrode layer and one electrolyte layer are shown in each of FIGS. 3 to 5 considering symmetry between the anode and the cathode and to make the figures clearer; obviously, the other electrode and a bipolar layer (20) could be added on these diagrams. For use in SOFC cells, it is desirable to have a zone that is slightly porous or is non-porous (11, 11') for which the dimensions are of the order of a few millimeters over the entire thickness of the electrode (12, 14). It is possible that the porosity of the compact zone (11, 11') will not be constant over the entire thickness of the electrode, wherein a porosity gradient could be created.

Figure 3A:
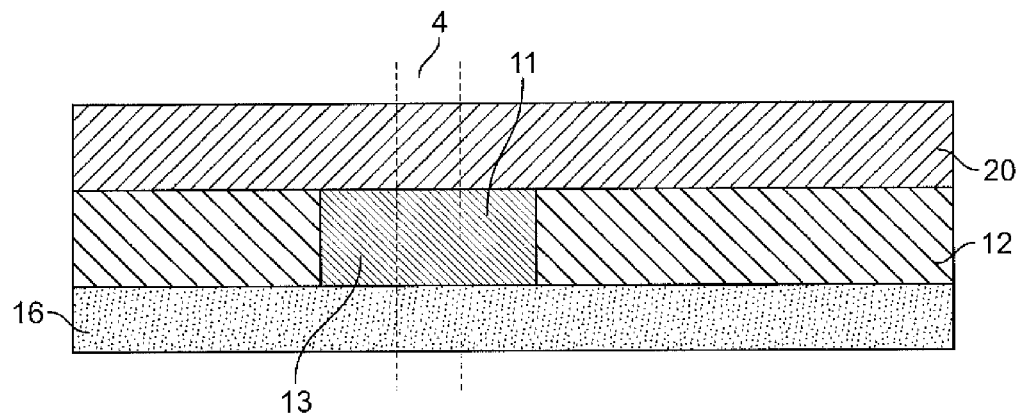
FIGS. 3 (*a-e*)show examples of zones that are non-porous or are slightly porous in electrode layers according to the invention.
Figure 3B:
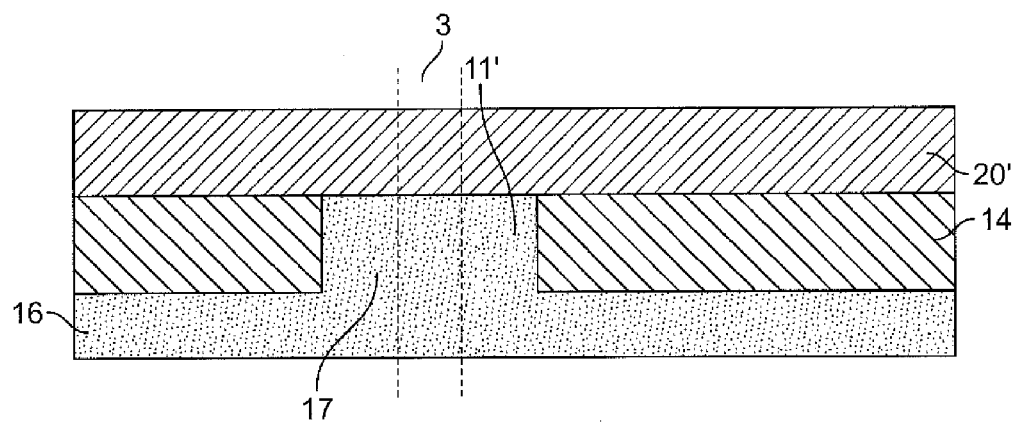

For example, the zone that is slightly porous or non-porous (11) can be created by densifying the electrode layer: FIG. 3*a* shows such an embodiment. The densification of the porous material of the electrode, in this case the anode (12), may be made for example by laser. In this case, as above, it is also possible to have a porosity gradient within the layer of material making up the electrode in the direction particular to the displacement direction of the ionic species.

It may be advantageous to use the fact that the electrolyte (16) itself is made of a dense layer, that is non-porous and is gastight. It is thus possible to create an electrolyte protuberance (17), that is inserted in the electrode layer, the cathode (14) in the context of FIG. 3*b*. The protuberances (17) may be made by pouring in strips combined with a thermal compression, or by plasma projection with mask. Advantageously, the protuberance comes into contact with the bipolar plate (20).

Figure 3C:
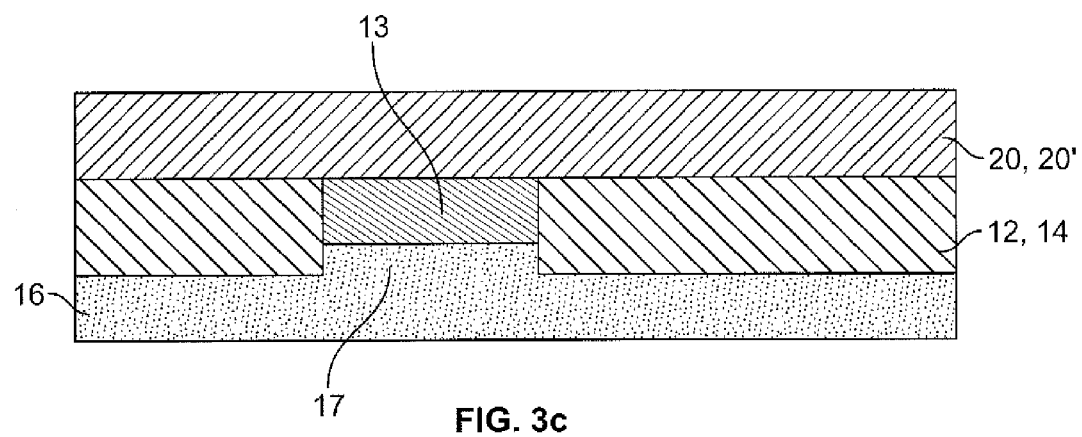
Figure 3D:
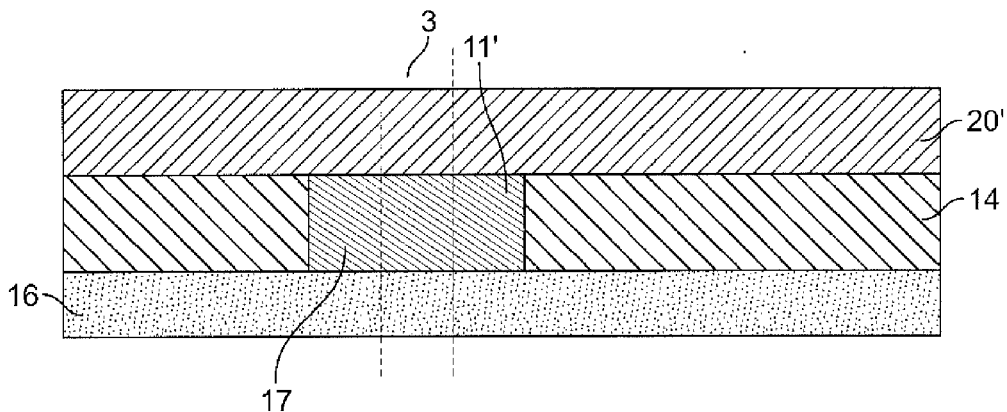
Figure 3E:
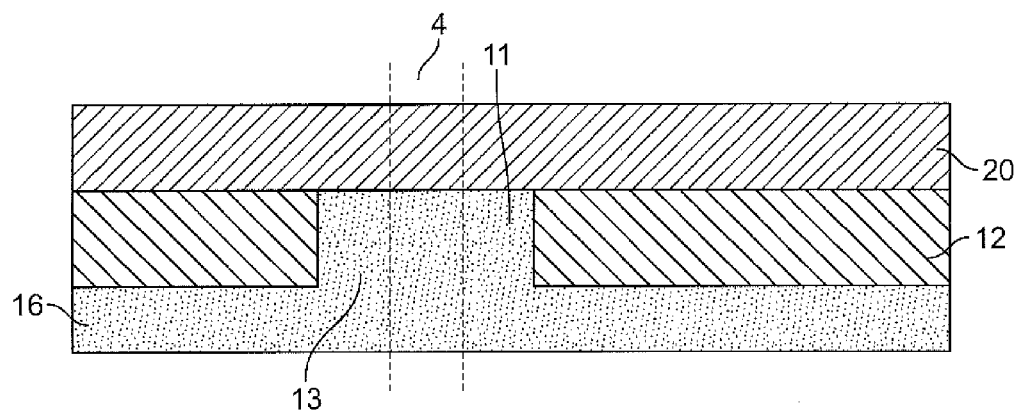

The different embodiments may be combined, for example with densification of the electrode layer (12) by prolonging a protuberance (17) of the electrolyte layer (16): FIG. 3*c*.

Figure 4:
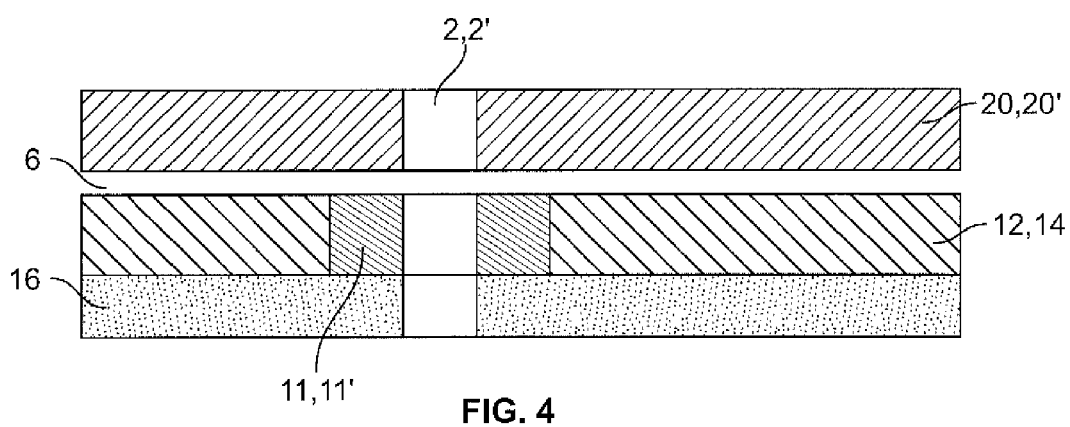
FIG. 4 diagrammatically shows another sealing defect within the basic cells of a fuel cell.

These zones that are slightly porous or are non-porous can then be used as a support to anchor the bipolar plate (20) as will be described later. Zones that are slightly or are non-porous are preferably used adjacent to or around gas passages (2) as shown in FIGS. 3 (*a-e*). FIG. 4 and in FIGS. 5(*a-d*) respectively, particularly in the case of densification (13) of the material from which the electrode is made, or the gas passages (2,2') can be drilled after assembly of the different layers necessary for a cell. The gas passages (2,2') permit gas to flow from the gas inlets (3) and (4) as shown by the arrows in FIGS. 5(*a-d*) through the electrolyte (16) the passages (2,2') in the non-porous zone 11,11' of the electrodes 12 and 14 and through the bi-polar plates 20,20' respectively. The different solutions for the passage of gas through passages (2,2') may be used within the same cell. Unlike tubular joints that are sometimes used, these parts are not added around a gas passage (2,2').

Thus, the anode (12) and cathode (14) can be densified around or adjacent the formation of an air passage (2,2') in the anode 12 and cathode 14 as shown in 3 (*a-d*) to allow for the passage of gas from the gas inlets (3, 4) (see FIGS. 5(*a-b*); for example, the anode (12) and the cathode (14) may be protected by an electrolyte protuberance (17) extending from the electrolyte (16) for forming the non-porous zone (11, 11') to allow for the passage of air and hydrogen from the gas inlets (3, 4) see (FIGS. 5(a)-(d). These two possibilities are only given for guidance, and it should be understood that each type of manufacturing of areas that are non-porous or are slightly porous, for example densification and/or creation of protuberance(s), is applicable indifferently to each electrode (12, 14), and that they can also be combined within the same cell stack (1), or even the same individual cell (5), for example cathodes (14) protected by densification and anodes (12) protected by electrolyte protuberances (17).

Therefore, use of solutions proposed by the invention improves the leak tightness inside the cells (5).

Furthermore, it might be useful to modify the arrangement between each electrode (12) and/or (14) and the bipolar plates (20,20') in order to improve the leak tightness, particularly within a stack of cells: in a conventional cell stack (1), individual cells (5) are adjacent to each other but even in the case of a vertical stack, gravity may not be sufficient to hold two successive assemblies sufficiently close to eliminate any gas infiltration. The problem may arise particularly for the junction (6) between the bipolar plate (20) or bipolar plate 20' and the anode electrode (12) or cathode electrode (14) and/or the electrolyte (16): see FIG. 4 for example.

As mentioned above, the bipolar plates (20,20') collects released energy and are conducting, and are therefore often metallic; the electrodes (12, 14) are made of porous material, often ceramic, which is also the material used for the electrolyte (16).

In particular, the two types of material have a different behaviour under heat, and temperatures in SOFC cells are high. It is indeed conventional to have coefficients of thermal expansion of the order of $10 \times 10-6/K$ for the electrolyte, and $15.7 \times 10-6/K$ for the bipolar plate, knowing that the temperature reaches 900° C. Since the thermal expansion of the bipolar plates (20,20') is higher than the thermal expansion of the adjacent electrode (12) or (14) or the electrolyte (16), shear forces are created at the junction (6) between the bipolar plate and its support, and these forces can cause rupture.

It is possible to take advantage of this difference in behavior by binding using a male/female type layout, with nesting between the bipolar plate (20) and/or (20') and the subjacent ceramic layer (16).

Thus, protuberances (22) can be created on the surface of one or both of the bipolar plates (20,20') facing the electrode layer (12, 14). Cavities (18) are made in the electrode layer (12, 14) for example by machining, so that the protuberances (22, 22') of the bipolar plates (20, 20') can be nested: see FIG. 5. The protuberances (22, 22') of the bipolar plates may be made by machining, or may be made by pouring in strips combined with thermal compression, or by plasma projection with mask.

Figure 5A:
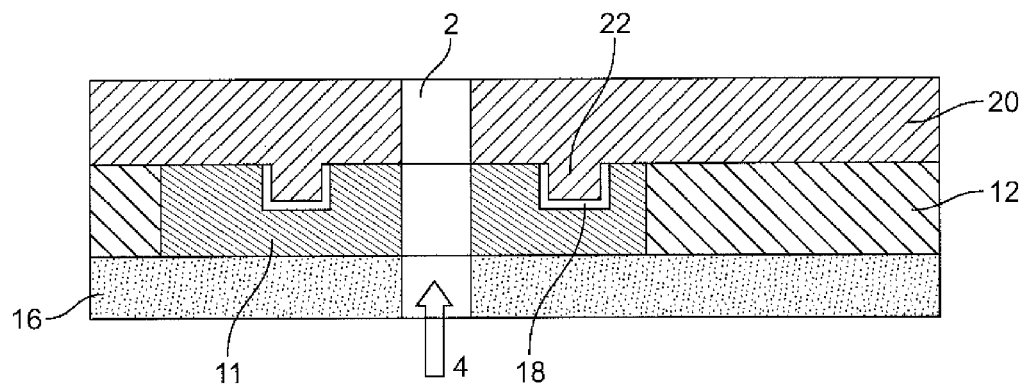
FIGS. 5(*a-d*)shows a preferred embodiment for passage of gas flow from the gas inlets between the bipolar plates and each electrode, at ambient temperature and at 900° C.
Figure 5B:
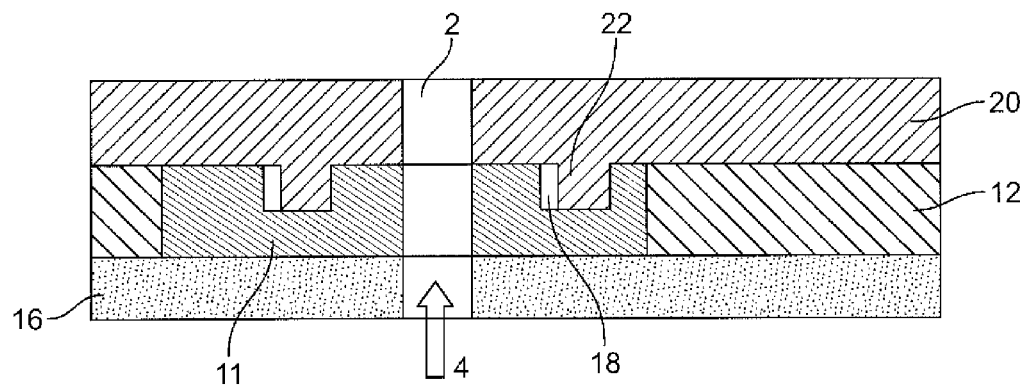
Figure 5C:
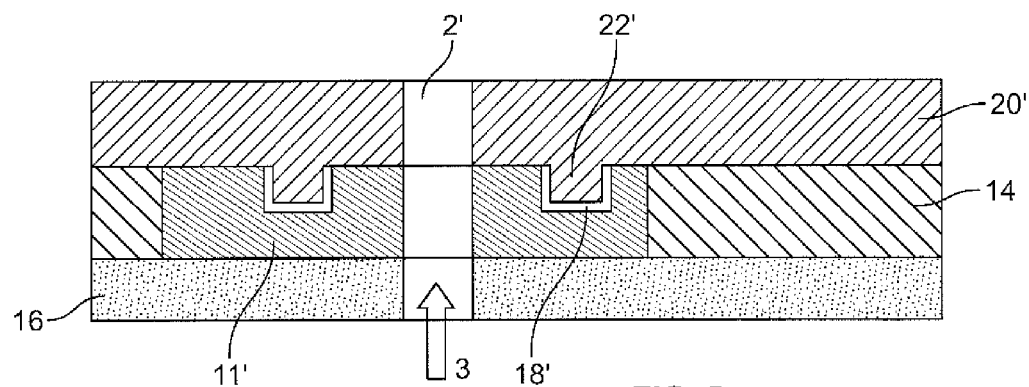
Figure 5D:
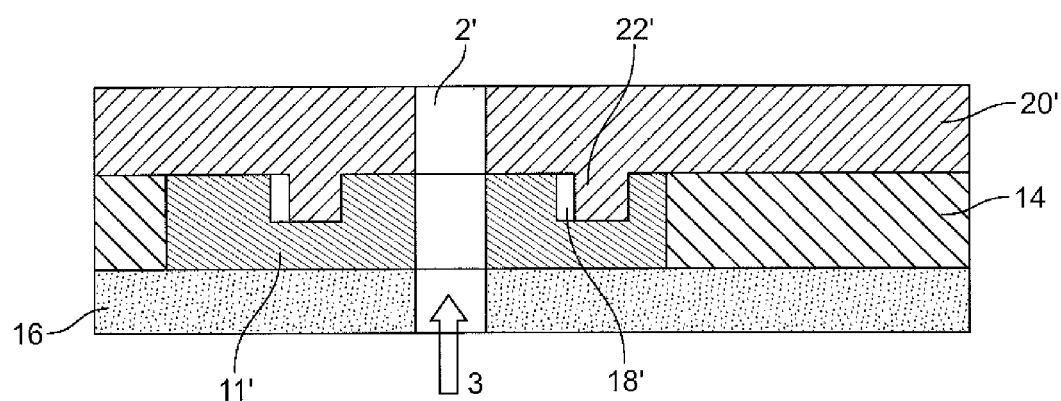

Preferably, the cavities (18, 18') are larger in width and/or in depth than the size of the corresponding protuberances (22, 22') at the ambient temperature, therefore leaving an assembly clearance (FIG. 5a-c). In this way, when the temperature increases, the greater expansion of the bipolar plates (20,20') than the electrolyte (16) and/or the electrode layer (12,14) will anchor the protuberance (22, 22') of the bipolar plate into the cavity (18. 18') (FIG. 5a-d) and will assure leak tightness without creating any additional stress. Therefore, this principle further improves the mechanical behaviour of the cell at high temperature.

Preferably, and as shown in FIGS. 5a and 5b, the assembly (18, 22) is made along the gas passage (2), associated with either or both of the air or hydrogen gas inlets, into the layers of cells (5) in the fuel cell.

It is advantageous to create cavities (18, 18') in one or more of the areas that are non-porous or are slightly porous (11, 11') of the electrodes (12,14) as described in one of the previous embodiments.

In particular, if the electrode (12), for example has a compact zone (11) that corresponds to a protuberance (17) of the electrolyte (16), it is preferred to create the cavity (18) in this protuberance, and to not change the rest of the electrode (12) in order to keep the efficiency optimum. Cavities may also be present for assembly within the electrode layer, even if it is not densified.

Figure 6:
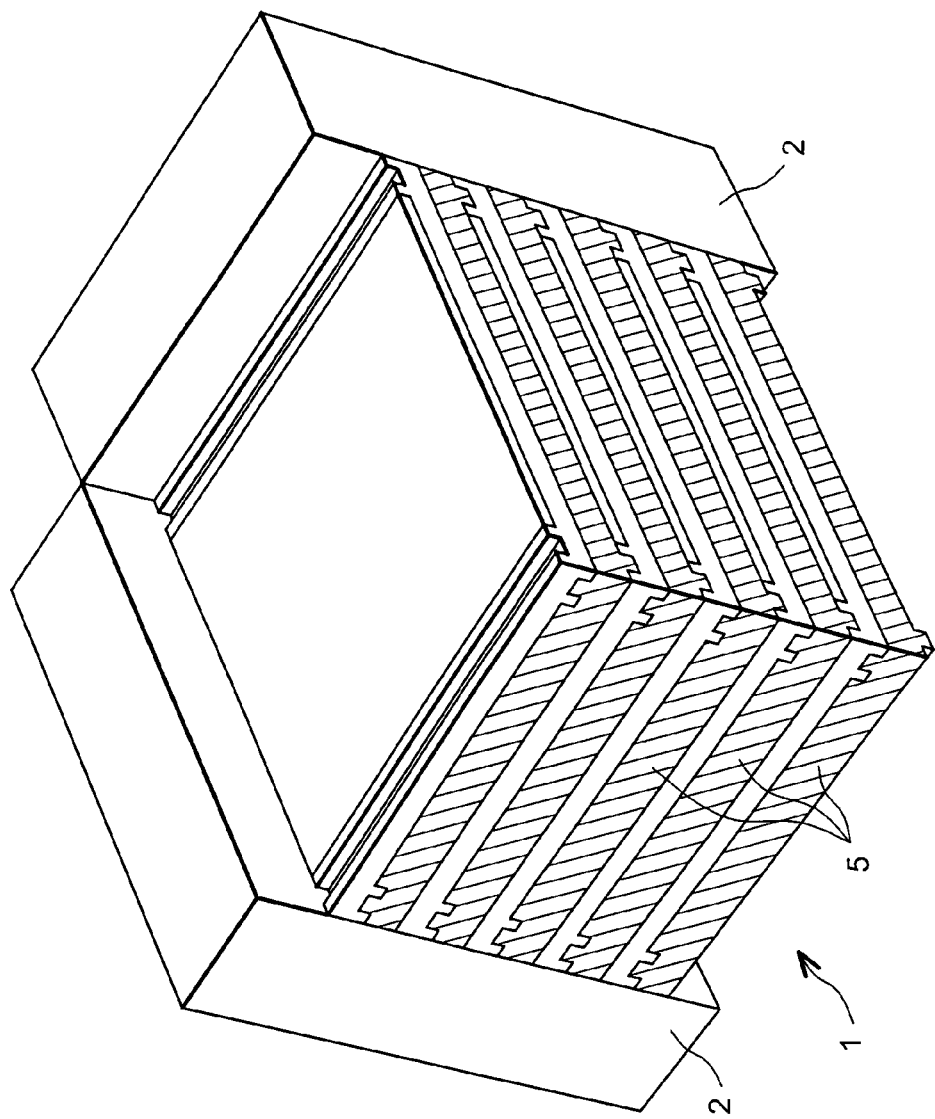
FIG. 6 shows an example embodiment of a plane fuel cell with external headers, in which the proposed two sealing concepts have been integrated.

The described modifications to the assembly, namely creation of zones in the electrode layer that are non-porous or are slightly porous, the use of such a slightly porous zone, or a protuberance of the electrolyte about gas inlets and creation of binding, can increase leak tightness and improve mechanical behaviour at high temperature. They can be applied for circular plane geometries like those shown in FIG. 2, but also for rectangular or square geometries such as stacked plates, or in structures designed around external headers (FIG. 6). The gas feed may be made through an external header, or the header may be formed by the stack of plates.

The invention claimed is:

1. An individual cell for a fuel cell having a stack of cells with each individual cell comprising:
   a first electrode layer having a first porosity;
   a second electrode layer having a second porosity;
   a solid electrolyte layer located between said first and second electrode layers;
   a first bipolar plate adjacent to the first electrode layer;
   a second bipolar plate adjacent to the second electrode layer;
   a first gas inlet;
   a second gas inlet;
   wherein the first electrode layer comprises a first non-porous zone forming a passage therethrough for gas flow from the first gas inlet;
   wherein said electrolyte layer has a protuberance which extends into the first electrode layer forming said first non-porous zone with the first non-porous zone representing a gas tight passage;
   wherein at least one of the two bipolar plates has a coefficient of thermal expansion higher than the coefficient of thermal expansion of the adjacent electrode layer and the electrolyte layer,
   wherein said one bipolar plate with said high coefficient of thermal expansion comprises at least a protuberance and the electrode layer adjacent thereto comprising a cavity with the protuberance of the one bipolar plate and the cavity in the adjacent electrode fitting into one another and
   wherein said one bipolar plate being connected to the adjacent electrode layer by nesting.

2. An individual cell for a fuel cell according to claim 1, wherein the first electrode layer has a first thickness and said first non-porous zone has a thickness identical to the first thickness.

3. An individual cell for a fuel cell according to claim 1, wherein the second electrode layer comprises a second non-porous zone forming a passage for gas flow from the second gas inlet and wherein said electrolyte layer has a protuberance which extends into the second electrode layer forming said second non-porous zone with said second non-porous zone representing a gas tight passage.

4. An individual cell for a fuel cell according to claim 3, wherein the second electrode layer has a second thickness, and the a second non-porous zone has a thickness identical to the second thickness.

5. An individual cell for a fuel cell according to claim 1, wherein said one bipolar plate is located adjacent to the first or second electrode layer.

6. An individual cell for a fuel cell according to claim 1, wherein the cavity is located in the protuberance of the electrolyte layer.

7. An individual cell for a fuel cell according to claim 6, wherein the protuberance of the electrolyte layer comprises a plurality of cavities.

8. An individual cell for a fuel cell according to claim 1, wherein the cavity in the adjacent electrode layer being larger in width than the corresponding width of the protuberance of the bipolar plate and/or the depth of the cavity is larger than the corresponding height of the protuberance of the bipolar plate.

9. An individual cell for a fuel cell according to claim 1, with either said first or second bipolar plate being located in the cell for separating the cell from an adjacent cell in said stack of cells.

10. An individual cell for a fuel cell according to claim 1, wherein the fuel cell has a circular plane geometry.

11. An individual cell for a fuel cell having a stack of cells with each cell comprising:
   an anode layer,
   a cathode layer,
   a solid electrolyte layer located between the anode layer and the cathode layer, and
   with the fuel cell comprising:
   a first gas inlet;
   a second gas inlet;
   wherein said anode layer comprises a non-porous zone forming a passage for gas flow from the first gas inlet;
   wherein said cathode layer comprises another non-porous zone forming a passage for gas flow from the second gas inlet;
   a first bipolar plate adjacent to the anode layer and having at least one protuberance extending in the anode layer;
   a second bipolar plate adjacent to the cathode layer and having at least one protuberance extending in the cathode layer; and
   wherein the anode layer further comprises a cavity formed in its non-porous zone and in which the corresponding protuberance of the first bipolar plate can fit, and the cathode layer comprises a cavity formed in its non-porous zone in which the corresponding protuberance of the second bipolar plate can fit.

* * * * *